(12) United States Patent
Wang Baldonado et al.

(10) Patent No.: US 6,581,066 B1
(45) Date of Patent: Jun. 17, 2003

(54) TECHNIQUE ENABLING END USERS TO CREATE SECURE COMMAND-LANGUAGE-BASED SERVICES DYNAMICALLY

(75) Inventors: Michelle Q. Wang Baldonado, Palo Alto, CA (US); Eric Allan Bier, Mountain View, CA (US)

(73) Assignee: Xerox Corporation, Rochester, NY (US)

( * ) Notice: Subject to any disclaimer, the term of this patent is extended or adjusted under 35 U.S.C. 154(b) by 0 days.

(21) Appl. No.: 09/449,540

(22) Filed: Nov. 29, 1999

(51) Int. Cl.[7] .............................................. G06F 17/30
(52) U.S. Cl. ...................................................... 707/102
(58) Field of Search .............................. 709/200, 201, 709/203, 217, 218, 219, 220; 707/10, 102

(56) References Cited

U.S. PATENT DOCUMENTS

| | | | |
|---|---|---|---|
| 5,261,097 A | 11/1993 | Saxon | 395/650 |
| 5,293,466 A | 3/1994 | Bringmann | 395/114 |
| 5,335,320 A * | 8/1994 | Iwata et al. | 395/155 |
| 5,801,700 A | 9/1998 | Ferguson | 345/349 |
| 5,809,248 A | 9/1998 | Vidovic | 395/200.49 |
| 5,892,510 A | 4/1999 | Lau et al. | 345/333 |
| 6,003,031 A * | 12/1999 | Hartikainen et al. | 707/10 |
| 6,131,100 A * | 10/2000 | Zellweger | 707/104 |
| 6,182,094 B1 * | 1/2001 | Humpleman et al. | 707/513 |

OTHER PUBLICATIONS

Arturo Crespo, Eric A. Bier, *Web Writer: A Browser–Based Editor for Constructing Web Applications*; Fifth International World Wide Web Conference, May 6–10, 1996, Paris France.

* cited by examiner

Primary Examiner—Moustafa M. Meky
(74) Attorney, Agent, or Firm—Finnegan, Henderson, Farabow, Garrett & Dunner, L.L.P.

(57) ABSTRACT

A method for creating secure command-language-based services in the context of a graphical-based services system. The method includes the steps of creating a structured representation of the command-language-based service by using information entered by a service creator via a first user interface; registering the command-language-based service with a generic service provider, the generic service provider being a software module that provides command-language-based services as part of the graphical-based services system; and creating a second user interface corresponding to the command-language-based service created.

38 Claims, 10 Drawing Sheets

FIG. 6B

TECHNIQUE ENABLING END USERS TO CREATE SECURE COMMAND-LANGUAGE-BASED SERVICES DYNAMICALLY

BACKGROUND OF THE INVENTION

A. Field of the Invention

The present invention relates generally to computer networks. More particularly, this invention relates to the creation and use of command-language-based (CLB) services in the context of a graphical-based service system.

B. Description of the Related Art

In response to societal demand, computer networks have been proliferating rapidly in recent years. Such networks include local area networks (LANS) and wide area networks (WANS) comprising a number of computers that may communicate with one another. Apart from sending messages, this communication between networked computers allows programs to be run on more than one computer in a network. For example, a graphical-based service, such as a World Wide Web airline reservation service, may present a user interface (UI) on a client computer while data input to the interface is transmitted to a server computer where a reservation database is accessed. This type of program execution, known as distributed programming, may be much more complicated than the above example but is nonetheless extremely common and efficient.

FIG. 1 shows an embodiment of the graphical-based services system of the present invention. The system includes a back-end server 102, a front-end client computer network 108, and a system administration station 116. The server 102, the network 108, and the station 116 are interconnected via the Internet 106 (or other such wide area network) or via a local area network. The server includes a software module, referred herein as a generic service provider (GSP) 104, that provides graphical-based services to clients in the computer network 108. The server 102 is a computer with sufficient capacity to support or serve a series of other computers connected to the server 102, in this case through the Internet 106, in a timely and efficient fashion.

The front-end computer network 108 includes at least one workstation 112 running a front-end application, and additional workstations 110. Workstations 110 and 112 are computers in the network and are capable of communicating with one another as well as with the server 102. A person of ordinary skill would recognize that the system administrator station 116 can be part of the network 108, the server 102, or a network that includes the server 102. Furthermore, the system administrator can also perform administration tasks from several workstations in the network 108, as well as from server 102. A person of ordinary skill in the art would also recognize that any workstation in the network 108, in the network of server 102 or the system administration station 116 is capable of running the front-end application.

The front-end application is a computer program that allows the user of workstation 112, for instance, to access the graphical based services provided by the GSP 104. An example of a front-end application is a Web browser. Another type of front-end application referred hereinto is one run in the system administrator workstation 116, which enables the creation of the CLB service by the system administrator (service creator).

A CLB service is a service that invokes a command from a set of commands (e.g., UNIX commands) in order to provide a certain type of service to a user (e.g., the "print" command would support a printing service). In the present example, the set of commands could be on the server 102 or other servers on the same network as server 102, as well as in the workstations (110, 112 or 116) in the computer network as long as the location of the command is specified.

For purposes of illustrating the functionality of the system of FIG. 1, as applied in the present invention, a system that provides document-based services has been designated as the graphical-based services system. A document-based service is a service that takes one or several documents as input and produces one or several documents as output.

The GSP 104 supports the graphical-based service by displaying to a user of the service a list of available services. This list is displayed via a UI (main menu UI 120 displayed in workstation 112). Main menu UI 120 could be a conventional graphical user interface that is updated by the back-end server 102 or by the front-end application program, being run in the workstation 112, to contain the services currently available in the GSP 104. In FIG. 1, three services are shown. At this point in the discussion, it is assumed that the first two service options, document reduction and enlargement, are properly registered in the GSP 104. Furthermore, the third option, document translation, will be explained in greater detail below in order to illustrate the conventional problems that arise in the addition of new services.

Once the services are made available, the user requests a service via the main menu UI 120, and the front-end application makes a service call to the GSP 104 accordingly. The GSP 104 then executes the service requested.

A particular example of the problems related to the existing art follows. The graphical-based services are registered in the GSP 104. The user of workstation 112 runs a front-application that presents the services that are available via a UI 120. If the user chooses the document reduction service (i.e., the user inputs a document into the system that is to be reduced) the user points at option 1 in the UI 120. Once the user points at that option from the menu in the UI 120, the front end application program makes a call to the GSP 104, in order to have the generic provider perform the service (reduction) on the user's document. The service that is offered to the user via the UI 120 can be based on a command from a command language set.

Assuming that a user of one of the additional workstations 110, not running the front-end application, does not have access to the graphical-based system, but instead knows of a Unix command that performs the reduction of documents by accepting as input (argument) the desired document and a reduction factor, the user could type in that command at the Unix system prompt and thus, could achieve the desired document reduction outside the context of the graphical-based system. The advantage of requesting a document reduction service in the context of a graphical-based service system is that the user does not need to be familiar with Unix commands (a service creator would have to be familiar) and does not need to have a computer running the Unix operating system. In addition, the document reduction service could be fluidly composed with other services available within the system. Nonetheless, the graphical-based services system can perform the reduction function by using the Unix command without requiring the end-user to even know what Unix command is being used. Thus, the service, as offered through the graphical-based services system, is based on a Unix command.

In designing a graphical-based system it is difficult to anticipate all of the services that users might wish to use. In particular, users of CLB systems (e.g., Unix) may already accomplish some tasks outside of the service-based system by using established commands and scripts, as implied above. Adding CLB services to a graphical-based services system has conventionally been troublesome.

An example of such a CLB service addition in the context of the graphical-based service system follows. Assuming that a translation service based on a command within a command language, option 3 in the UI 120, is to be added to the graphical-based service system by the system administrator, the administrator has to go through several steps. First, the system administrator has to locate, for example, an existing Unix program, command or script to perform natural language translation of a document. The new service is based upon this existing Unix command/program. To add the translation service to the graphical-based system, the system administrator must create the service by programming and have the service call on the Unix program. In this context, "service" refers to the CLB service screen that would be presented to the user once the user chooses the translation option from the UI 120. This requires not only that the system administrator possess good programming skills or learn a new programming language, but that he or she spend a considerable amount of time in incorporating the new service to the graphical-based system.

System security is a problem associated with the creation of CLB services in the context of a graphical-based service system, and in particular, of allowing a system administrator to create the CLB services by programming. In deploying a graphical-based services system, it is expected that the system is to be used by a variety of users, some of whom may be malevolent (e.g., hackers). In a graphical-based services system that allows access to system commands on server 102 (via GSP 104), this could pose a security threat. Malevolent users could attempt to force the graphical-based services system to execute dangerous commands (e.g., "rm", which removes files) or to consume too many resources.

As discussed above, services such as the document reduction service have been implemented by using programs/commands that are available on server 102 (or on the user workstations 110, 112, 116 or any server accessible on the network of server 102). However, creating a new command-based service requires programming, including taking security precautions that are similar for each new command-based service that is created.

Thus, there is a need in the art for a system that provides the capability to incorporate new CLB services into a graphical service-based system in a timely manner and without the need of extensive programming by the service creator.

SUMMARY OF THE INVENTION

Accordingly, it is an object of the present invention to meet the foregoing needs by providing systems and methods for creating secure CLB services in the context of a graphical-based services system.

Specifically, systems and methods for meeting the foregoing needs are disclosed. The method includes the steps of creating a structured representation of the command-language-based service by using information entered by a service creator via a first user interface; registering the command-language-based service with a generic service provider, the generic service provider being a software module that provides command-language-based services as part of the graphical-based services system; and creating a second user interface corresponding to the command-language-based service created.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

FIGS. 6A–6B illustrate the standard user interface for service creation of FIG. 2;

DETAILED DESCRIPTION

Figure 1:
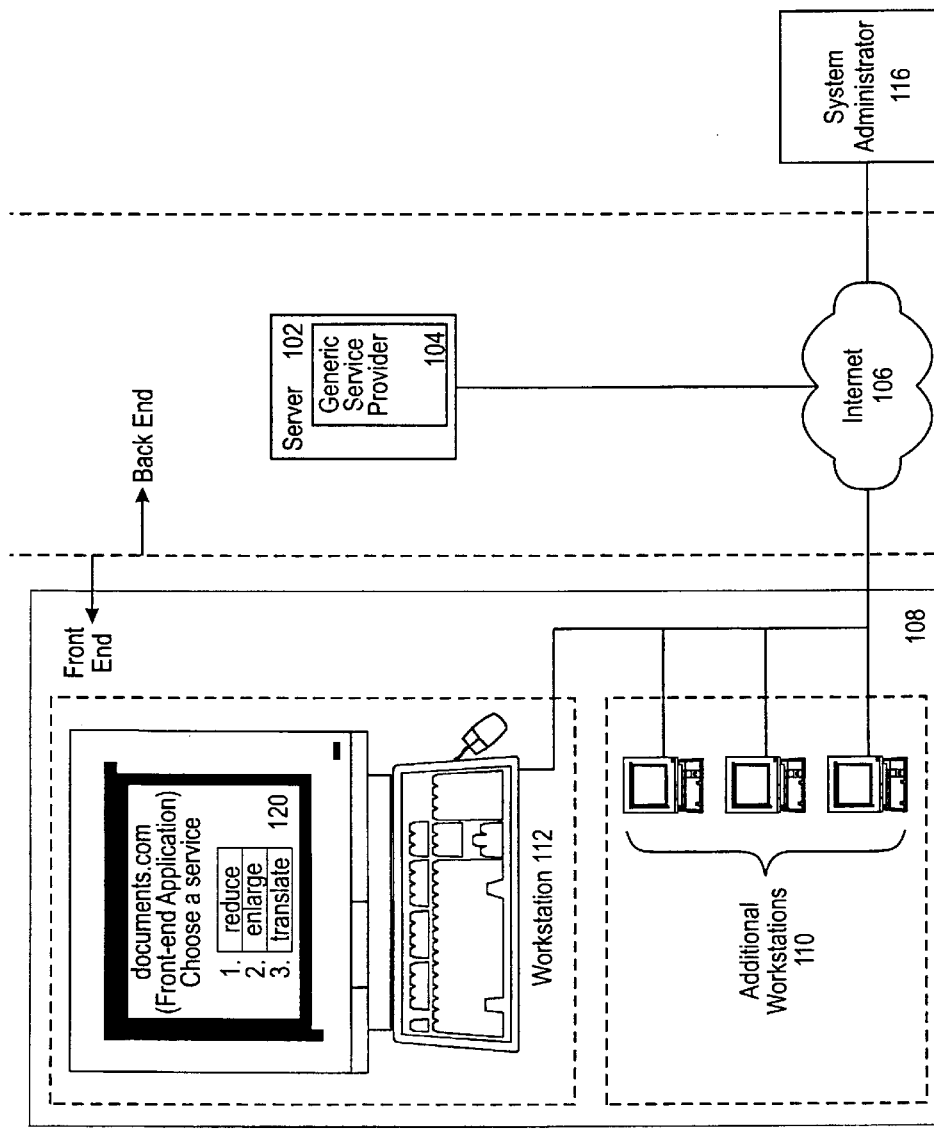
FIG. 1 illustrates an embodiment of the graphical-based services system of the present invention.

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention allow the creation and use of CLB services in a graphical-based services context. For purposes of the following description, the systems and methods consistent with the present invention are only described with respect to a document-based service as the graphical-based service, and with Unix commands and scripts supporting the CLB services. The description should also be understood to apply in general for any graphical-based service and any CLB service. Further, the term "User Interface" is mainly described in the present application as a graphical user interface (GUI). The invention, however, should not be limited to conventional GUI's, but should also be understood to apply to any mechanism whose functionality is to serve as an interface between a user (e.g., a person) and the apparatus through which the service is facilitated (e.g., computer). The combination of a text editor (displayed on a computer screen) and a keyboard is an example of such user interfaces.

Figure 2:
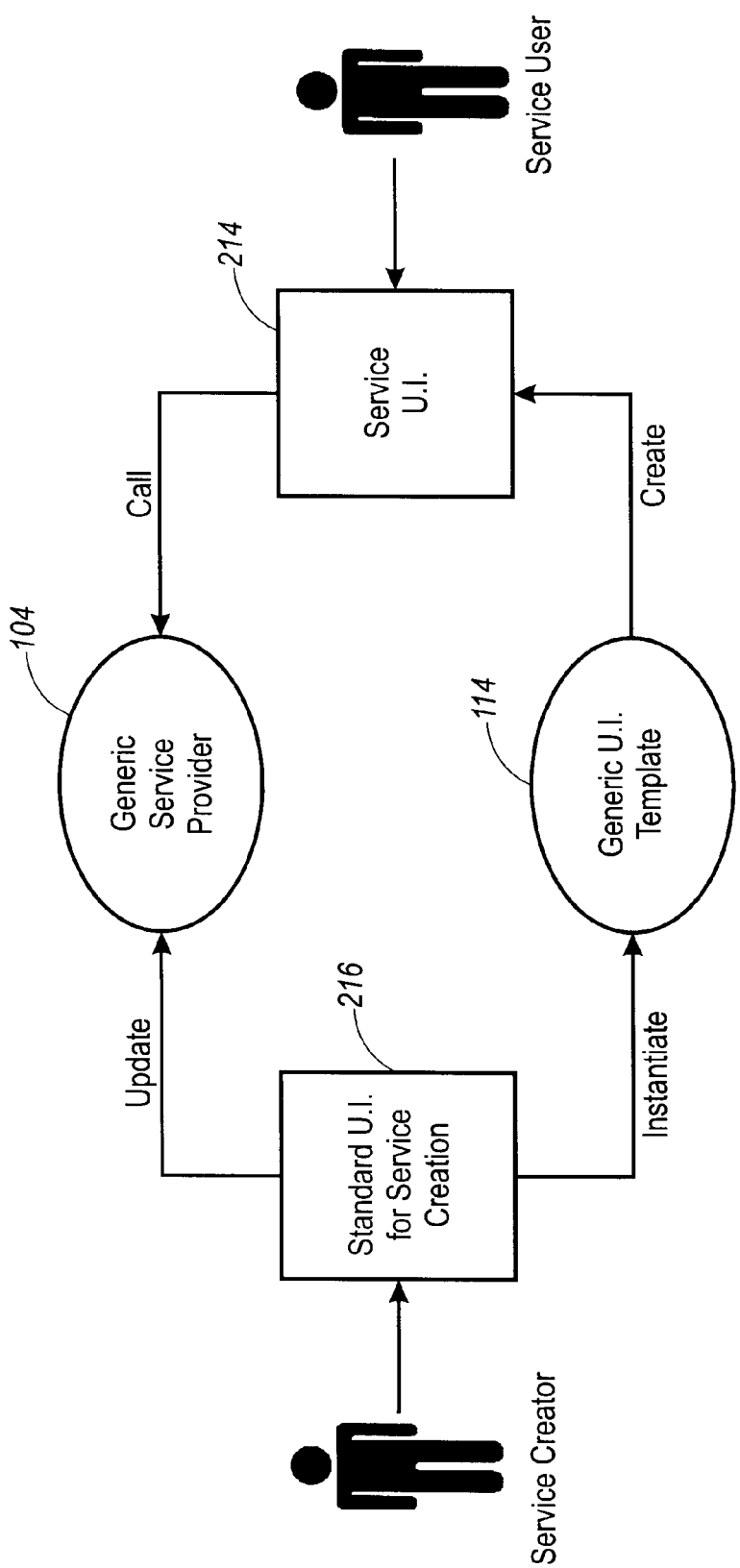
FIG. 2 illustrates the process involved in creating a command-language-based service according to the present invention.

The service creation process of FIG. 2 can be divided into front-end, back-end, and system administration functionality. One possibility is to have the back-end functionality be provided by the GSP 104; to have the system administration functionality be provided by the standard user interface for service creation (service creation UI) 216 and the generic user interface template (generic UI) 114; and to have the front-end functionality be provided by the service user interface (service UI) 214. The service creation UI 216 is displayed to the service creator via a workstation (e.g., station 116 in FIG. 1). The service UI 214 is displayed to the service user via a workstation (e.g., 112 in FIG. 1). The generic UI 114 is not displayed to either the service creator or the service user. The service creator, who would generally be a system administrator, can also become a service user.

Before creating the CLB service, the service creator must choose the Unix command or script upon which the CLB service will be based. This, of course, does not preclude the service creator from writing his or her own scripts. For purposes of this invention, however, it is assumed that the desired command or script is readily available in the system (either in the server 102, the workstations 116, 112 or 110, or on the network of server 102).

The first step in the creation of the CLB service is for the service creator to access the service creation UI 216. The service creation UI 216 is part of a front-end application running on the workstation being used by the service creator. The creation process is explained in greater detail with reference to FIG. 3, FIGS. 6A–6B, and FIG. 7. It suffices to mention at this point that the CLB service is created by having the service creator fill out a form displayed as part of the service creation UI 216. The information filled out by the service creator includes the name of the Unix command/script, its location in the system, and information about the options that will be presented to the user of the CLB service via the service UI 214.

Once the service creator fills out the form, the front-end application producing the service creation UI 216 performs two main functions. First, it submits the information to the GSP 104, where the new CLB service is registered and the GSP 104 is updated on the fly (immediately). In general, even though a preferred implementation of the system does indeed update the GSP 104 immediately, it is nevertheless plausible to assume that another embodiment might carry out the invention without making the service available immediately.

The second function performed by the front-end application is to instantiate the generic UI 114 and make the instantiated generic UI 114 available in the system. That is, the service UI 214 is nothing more than an instantiated generic UI 114.

Instantiation can be seen as one step in which a specialized interface corresponding to the new service (service UI 214) is created. The creation of the service UI 214 refers to the parameterization of an existing form (generic UI 114), based on a template provided as part of the front-end application software, with some of the information entered by the service creator through service creation UI 216. Contrary to the conventional practice, the service UI 214 is not created by programming. As discussed above, the system's generic template (generic UI 114), invisible to the user, serves as a model for all the CLB services created. This is possible due to the structured representation of the CLB service.

Figure 8:
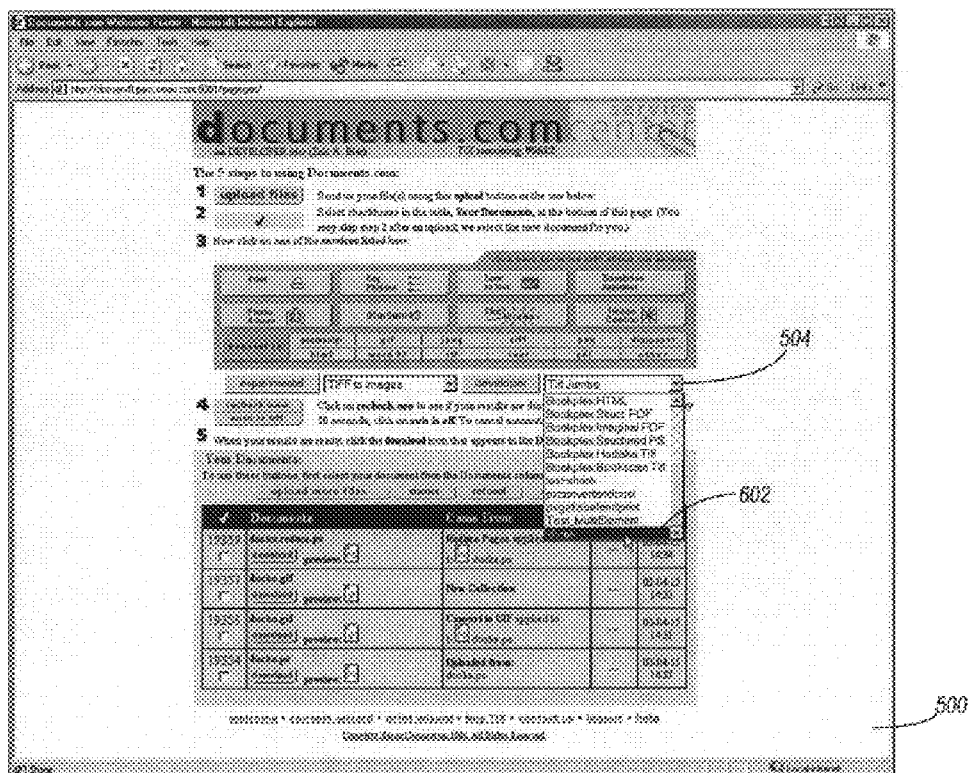
FIG. 8 illustrates the front-end application of FIG. 5, listing a new command-language-based service as part of the services available.

Another task performed by the front-end application is to include the name of the new CLB service in the graphical-based services main menu UI 500 (see FIG. 8). The newly created service is immediately made available to users of the graphical-based services system.

When the service user accesses the main menu UI 500 (in FIG. 8), he or she encounters several options describing services available in the system. Assuming that the choice is a CLB service, the main menu UI 500 accesses the created service UI 214 and displays it to the service user. The service user then fills out a form presented in the service UI 214 if the CLB service requires the user to enter arguments or options for the command or script upon which the CLB service is based.

After the form in the service UI 214 is filled out by the service user, the service user submits a service request and the service UI 214 makes a service call to the GSP 104. The GSP 104 responds to this service call by executing the desired CLB service, based upon the Unix command or script picked by the service creator.

Figure 3:
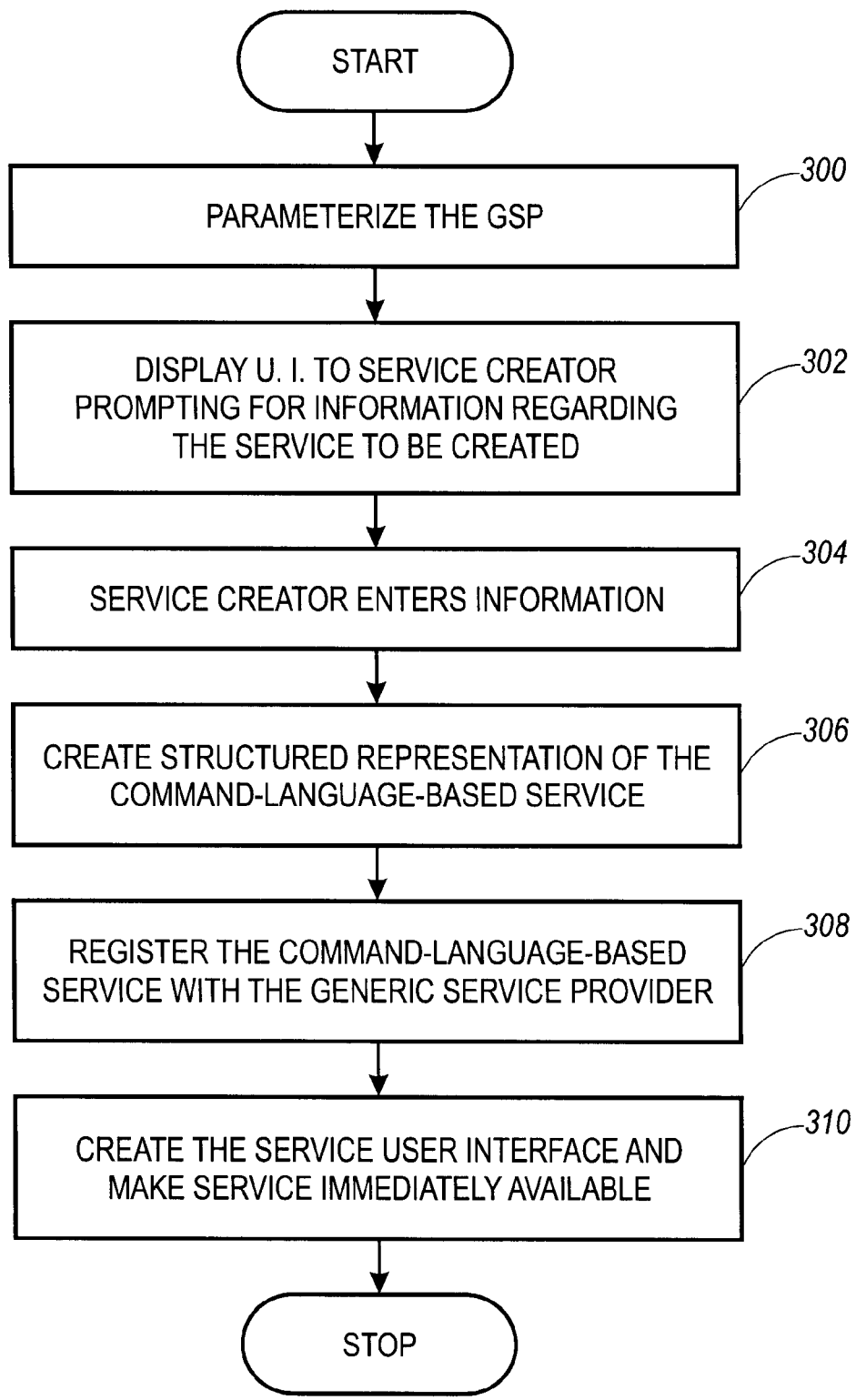
FIG. 3 illustrates a method for creating command-language-based services in the context of a graphical-based services system according to the present invention.

FIG. 3 discloses a preferred method of creating CLB services. In step 300, the GSP is optionally parameterized so that the CLB services are carried out securely. That is, the GSP 104 is provided with a list of commands that a service creator would be unable to employ in the creation of CLB services.

In step 302 the service creation UI 216 is displayed to the service creator, prompting for information regarding the CLB service to be created, in order to create a "structured representation" of the CLB service. The term structured representation refers to the service creator filling out a form that prompts for structured descriptions of the desired command's components and properties. In particular, these descriptions include the name of the command upon which the service is to be based, the location of the command and characteristics of the options in the command. The options in the command are the same as the arguments or input that a given command might use to perform its intended function. The valid values supplied as an option for a command are referred to as legal values. Legal values are recognized by the system. A legal value for an option "number of copies" in a "print" command is a number, whereas an illegal value is a letter.

The term "characteristics" refers to the restrictions that the service creator desires to impose upon the use of the command as part of the CLB service. By entering these characteristics of options the service creator restricts the set of legal parameters and values permitted for each option associated with a command. One such restriction could be putting limits on the option values that are acceptable. An application of that type of service-specific security mechanism is to avoid having users request to copy 10,000 pages of a document. Furthermore, the options can be characterized by assigning user friendly names related to the functionality of the corresponding options. For example, if the Unix command or script is "print" and the option "n" (as recognized by the Unix system) refers to the number of copies to be printed, the option can be characterized with the name "number of copies". Step 304, entering the requested information, naturally follows.

In step 306 the structured representation of the CLB service is created by using the information entered in step 304. The CLB service is registered with a generic service provider in step 308. As mentioned above, the generic service provider is a software module that provides CLB services as part of the graphical-based services. In step 310 the service UI 214 is created by first parameterizing a generic UI 114, and second making the parameterized UI available in the system.

It is important to draw a distinction between the parameterization of the generic UI 114 as described in step 310, and the parameterization of the GSP 104 as described in step 300. The first involves creating a UI corresponding to the newly created service by modifying or customizing a standard template (generic UI 114) with information entered by the service creator in step 304.

The second type of parameterization refers to providing the GSP 104 with a list of commands that the provider would refuse to execute as part of a request to create a new CLB service from a service creator. This list could be provided to the GSP 104 by the owner or operator of the server 102. Thus, a list of "forbidden commands" limits what a service creator can do. For example, service creators might be prohibited to build services around the Unix "rm" (remove) command, both because they directly represent a serious threat to the system, and because it might be deemed difficult to write a secure service using this command.

In addition to providing the GSP 104 with a list of forbidden commands, a list containing "dangerous" characters is also provided to the GSP 104 (e.g., by the service creator), so that it can filter out the characters from the command when the values are supplied as part of the arguments of a valid (not forbidden) command, entered by a service user. Examples of such dangerous characters include the ";" character (i.e., by entering ";" in a Unix command, a second command is added). Thus, the parameterization of the generic service provider 104 adds security to the system from both a service user and a service creator standpoint.

One example of filtering dangerous characters follows. It is assumed that the service is based on the "shrink" command and that the service user is allowed to specify one option ("shrink type"). The system can further be made secure by having the service creator specify that there are only two choices for shrink type, 2up and 4up, where these choices correspond to the desired document reduction factor. After a service is created, the service user could only pick one of these two options from the front-end application. But supposing that the service creator creates the "shrink" service so as to allow the service user to type in an arbitrary string of characters for the option value, such as "4up; rm *", the effect produced on the GSP 104 without filtering dangerous characters is that it would execute the command "shrink 4up; rm *". As mentioned above, in Unix ";" is used to indicate that a second command follows. The result would be performing the shrink command but also removing some of the files in the machine on which the invoked command resides. If filtering of the dangerous command";" is performed, the command executed would be "shrink 4up rm *". After filtering, "rm *" is treated as an argument of a second option, and consequently it will most likely be ignored by the shrink command. In the event that it is not ignored by the command and the command execution fails, it is still more secure than the alternative that leads to the removal of all files in the machine.

In sum, FIG. 3 includes two main steps in which security is provided. In step 300 the GSP 300 is parameterized to enable the filtering of forbidden characters. In step 302, security is provided because only services created by the service creator can be used, because the service creator limits the options possible for the command at the core of the service, and because the service creator limits the option values possible for the command options.

Figure 4:
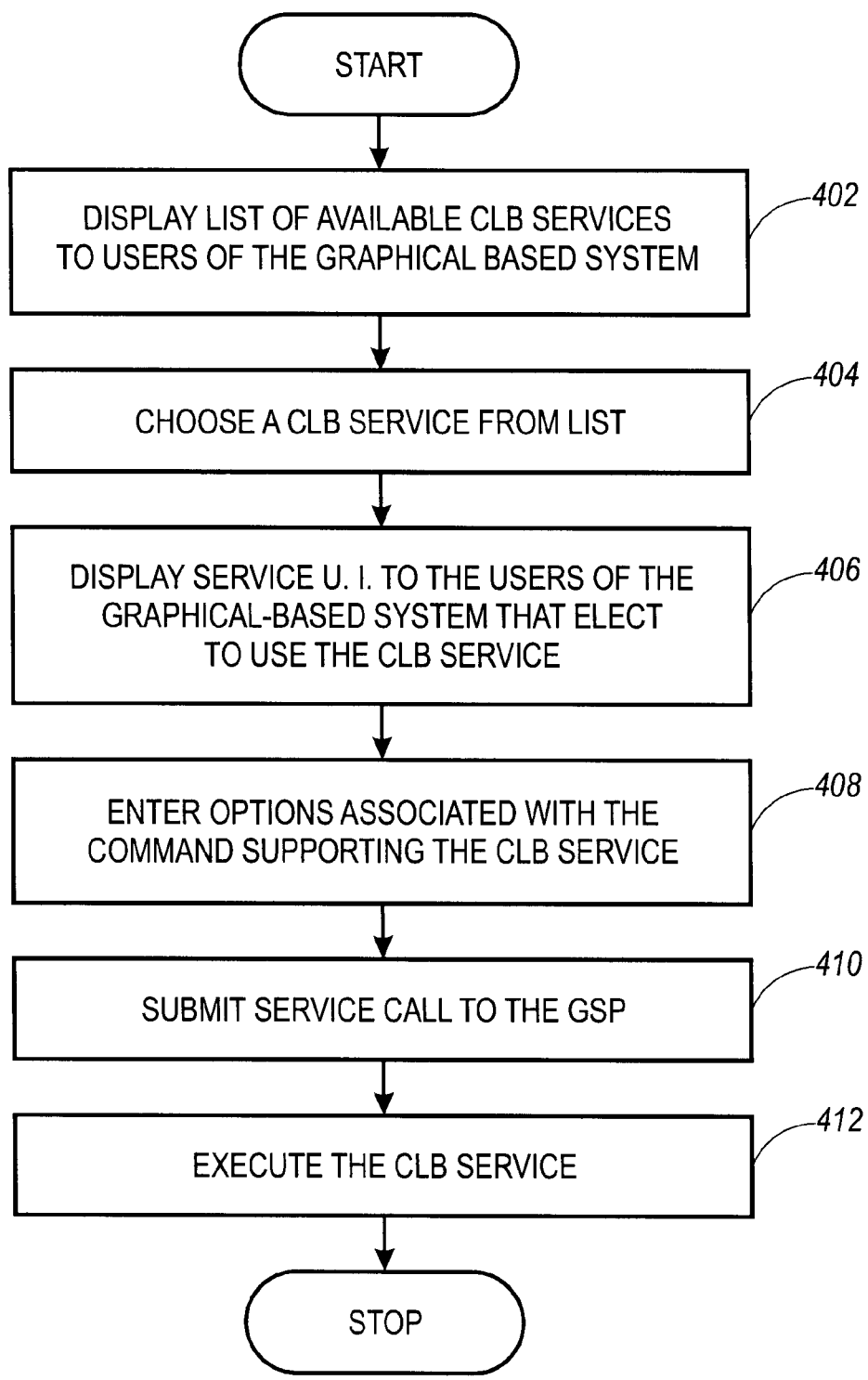
FIG. 4 illustrates a method for using command-language-based services in the context of a graphical-based services system according to the present invention.

FIG. 4 discloses a preferred method of using CLB services. Step 402 assumes that the CLB service to be used has been registered with a GSP 104. The CLB service is immediately made available to users of the graphical-based system after the service has been registered. The service is made available to the users by adding the newly created and registered CLB to a list of other services available as part of the graphical-based services system. This list of services is displayed via the main menu UI 500 of FIG. 8. In step 404 the service user chooses one of the CLB services available from the main menu UI 500.

The service UI 214, corresponding to the CLB service chosen in step 404, is displayed to the user in step 406. Technically, this is the point at which the user of the graphical-based services systems becomes the user of the CLB service, as a result of having invoked the CLB service. The CLB service, as well as the service UI 214, are structured as described in the discussion of the creation of the service UI 214.

In step 408 the user of the CLB service enters the desired options associated with the command via the service UI 214. After the options are entered, they are used to parameterize a service call to the generic service provider 104 (step 410). The service call is parameterized in the sense that the call by the front-end application follows the same format for all commands. The format includes the parameters associated with the CLB service being requested, such as command name, options name, input value for option, etc.

Finally, the CLB service is executed (step 412) by the GSP 104. This execution of the service is subject to a refusal of the GSP 104 to execute the command upon which the service is based. Furthermore, the service execution could also be subject to the filtering of dangerous characters entered by a user for the value of an option associated with the command and could also be subject to the restriction of option values to a subset of the legal values as specified by the service creator via the option characteristics.

Figure 5:
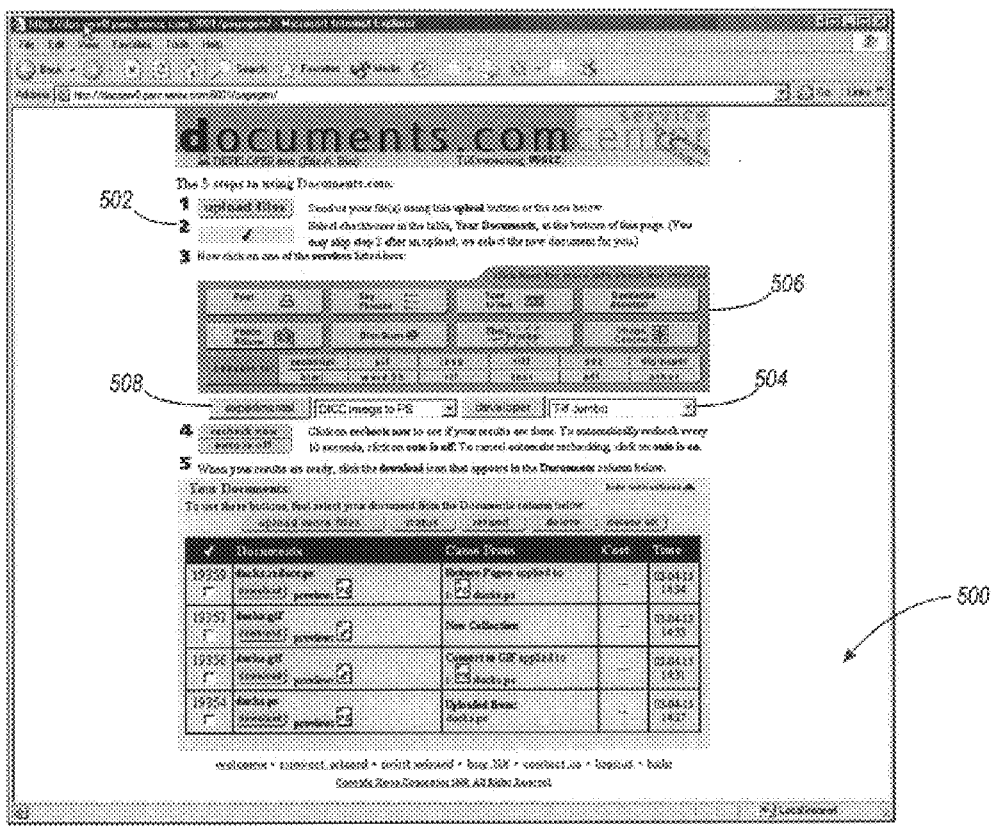
FIG. 5 illustrates an embodiment of a front-end application as seen by an user of the command-language-based services.

FIGS. 5–9 show an implementation of the methods discussed above as applied to a document-based service. FIG. 5 shows a main menu UI 500. Basically, two inputs are required from the user of this graphical-based services system. As indicated in the figure, the user selects the document to be input (see instruction 502). After the user selects the document(s) to be processed, the user selects a service by clicking on one of the buttons 506, 504 or 508. As will later be seen in FIG. 8, when button 504 is clicked, a list of available services, including a CLB created service, is displayed.

Figure 6A:
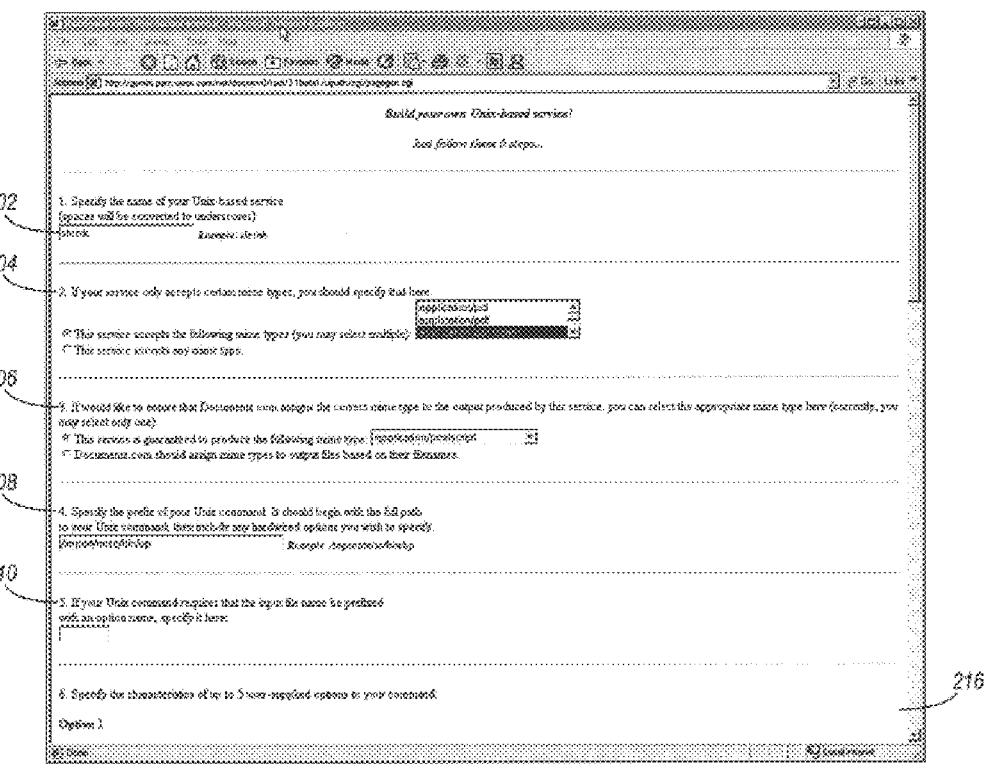
Figure 6B:
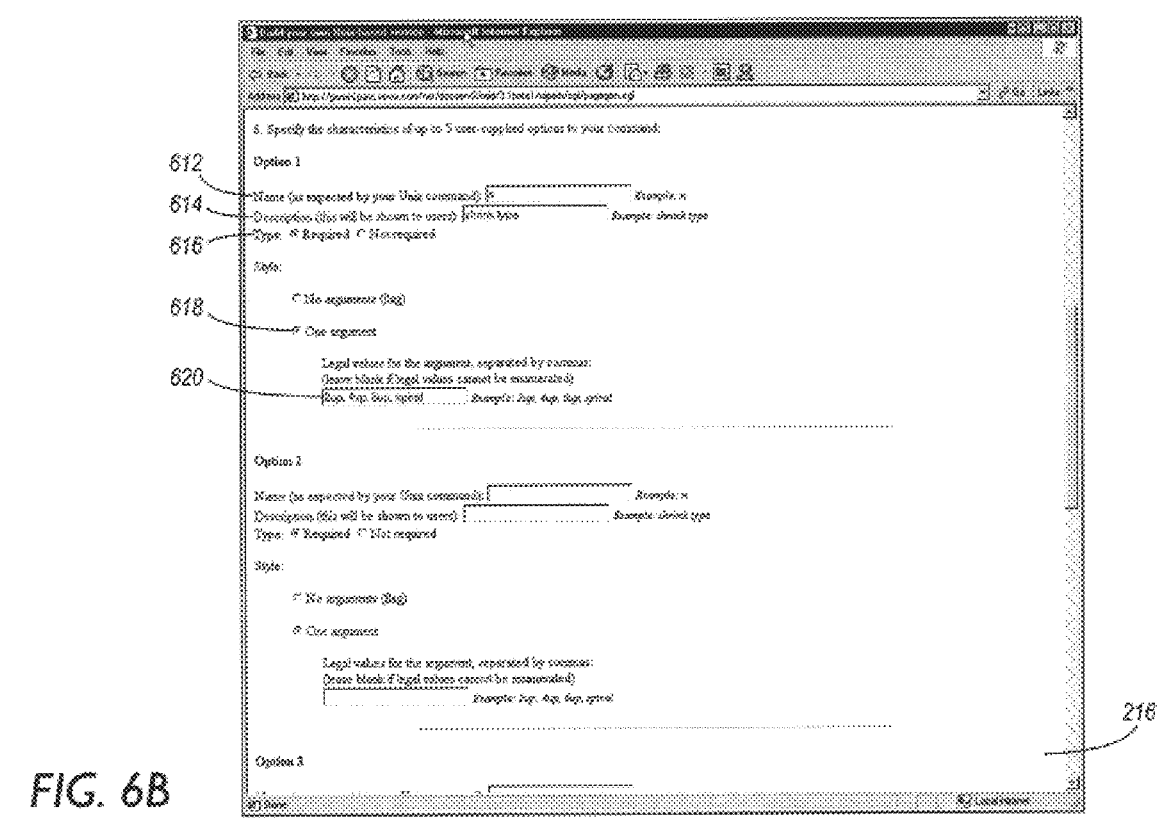

FIGS. 6A–6B show the service creation UI 216 as seen by the service creator. In this particular case, the structure of the CLB service consists of the name of the service 602, a list of Multipurpose Internet Mail Extensions (MIME) types accepted by the service 604 (if any), indication of the MIME type 606 to be produced by the service, the prefix or location of the Unix command upon which the service will be based 608, an option name to precede the input file name (if required by the command) 610, and a number of options to supply to the command (possibly none), detailed mostly in FIG. 6B. The original function of MIME was to extend the format of Internet mail to allow non-US-ASCII textual messages, multipart message bodies, and non-US-ASCII information in message headers. MIME types are now used by Web browsers and other applications to decide how to process input documents.

In the example of FIG. 6A, the name of the command is "shrink". This command could have several arguments as input. Since the graphical-based service system of this example is a document-based service, one such argument is the document name of the document to be processed. It is plausible to assume that there are several other options that can be entered as an argument to the command. To provide security in the system of the present example, the service creator restricts the number of command options available in the CLB service to one, as seen in FIG. 6B (only the form for "option 1" is filled out; the forms for other options are blank).

The characteristics of the option include the name of the option 612, the description of the option 614, an indication whether the option is required 616, an indication of the number of values the option can have 618, and a restriction of the legal values allowed for the option values 620. The restriction of option values by the service creator adds security to the system and will make selection of a value convenient for the user.

Blank 612 represents the name of the option as it would be used in Unix (e.g., "n"). Blank 614 represents the user-friendly description of that option (e.g., "shrink type"). In blank 616 the service creator specifies whether the user must supply the option or if it is optional. In blank 618 the service creator specifies whether the option is simply a flag or whether it is an option that requires a value. Further, the service creator may specify, in the case of an option that requires a value, whether there are restrictions on what those values can be. Finally, in blank 620 the service creator limits the values for the option n to being one of 2up, 4up, 6up or spiral (these are layouts that may be used in shrinking the input document).

The command name 602 is particularly important for two reasons. First, it identifies the command upon which the CLB service is based. Second, the GSP 104 uses the name of the command 602 to compare with a list of commands that are not to be executed and refuse to create the CLB service when the service sought to be created is based upon a forbidden command, as explained above.

Figure 7:
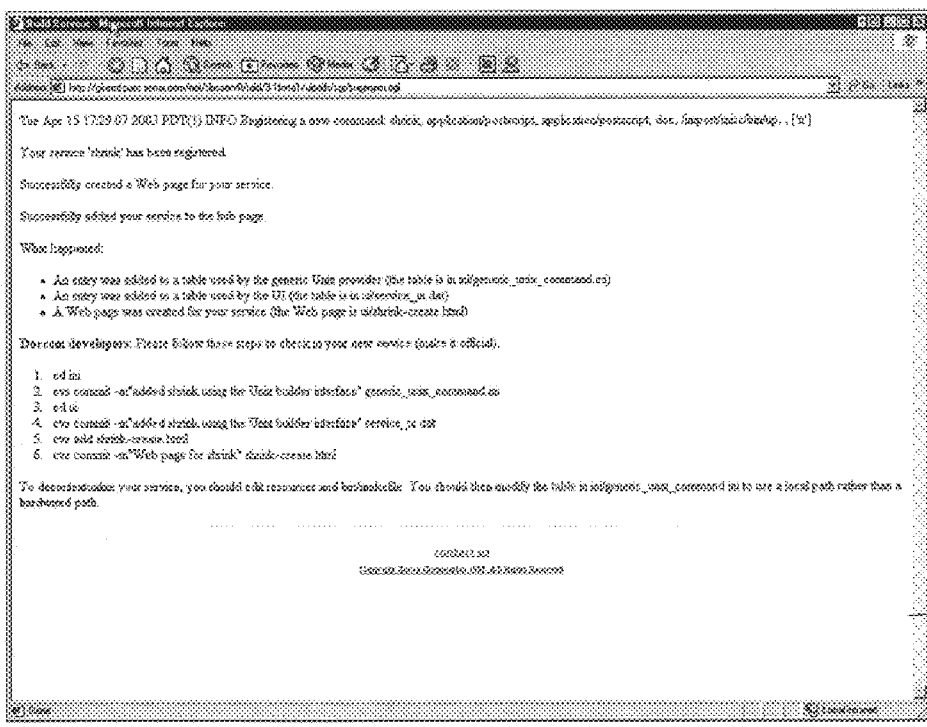
FIG. 7 illustrates the standard user interface for service creation of FIG. 2, indicating that a new service has been registered.

Referring to FIG. 7, after the command information has been entered in the forms displayed via the service creation UI 216, and submitted to the GSP (not shown), the interface 216 displays a message indicating that the CLB service has been registered, that the service UI 214 has been created, and that the new service has been included in the main menu UI 500. FIG. 8 shows the main menu UI 500, including the shrink service 602 as one of the services available in the graphical-based system.

Figure 9:
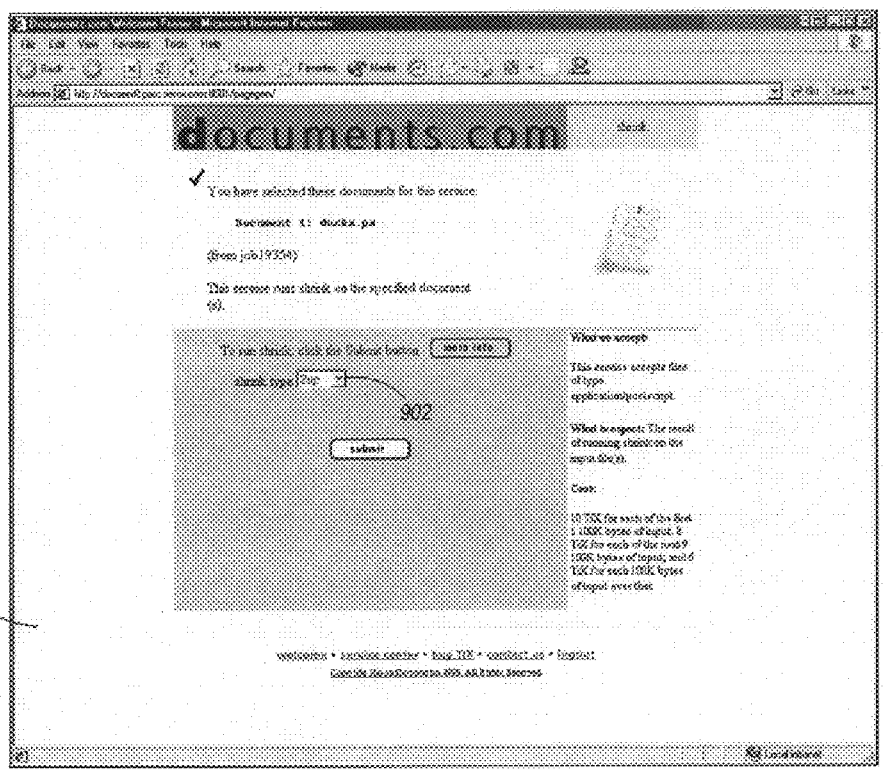
FIG. 9 illustrates the service user interface of FIG. 2, corresponding to the new service

FIG. 9 discloses the service UI 214 as seen by the user of the CLB service. The set of legal values that serve as an argument for the shrink command has been restricted by the service creator, as evidenced by the field 902, which contains a value of 2up and allows the user to choose other values (not shown) upon clicking the button designated with a down arrow head, shown to the right of the current selection 2up. That is, this button, when clicked by the user, would show a list of the legal values defined by the service creator in blank 620 of FIG. 6B.

In sum, the present invention allows a person who wishes to create a new CLB service to do so through a simple UI rather than by programming. The person who creates the service needs to know what commands/programs are available on the server 102, any server accessible on the network of server 102, or the workstations 110, 112 and 116. In addition, the service creator needs to know how to invoke the desired command/program appropriately. The new CLB service automatically has some security mechanisms put into place. For example, to add the translation service in the new system, one only needed to fill out a form describing where the translation program could be found, what parameters the user would be allowed to provide to the program, and so forth. Typically a service creator would be a person who is customizing the system for a group of end users. For example, if a document-based system is deployed to client networks, a system administrator would likely want to extend the system to include services that the client would find useful. This job is much easier if the system administrator can use a UI to add a new service rather than having to learn how to program the system. In addition, it would not be likely that the owner of the document-based service system (the provider) gives out the source code to the system when the system is deployed. This makes the system extensible even when it is not possible to augment the system by programming.

The system security is provided by three main features of the present invention discussed above. First, the service creator chooses what commands (CLB services) are added and made available to users of the graphical-based system. Second, the service creator restricts the set of legal values that can be input as part of a CLB service request by a user. Third, the GSP 104 can completely filter commands and command values for dangerous characters. In essence, the system is secure because the back-end of the system does not allow the service creator nor the service user all the programming flexibility that is possible for the owner of the back-end system.

The foregoing description of preferred embodiments of the present invention provides an exemplary illustration and description, but is not intended to be exhaustive or to limit the invention to the precise form disclosed. Modifications and variations are possible in light of the above teachings or may be acquired from practice of the invention.

What is claimed is:

1. A method for creating a secure command-language-based service in the context of a graphical-based services system, the command-language-based service being available to users of the graphical-based services system, the method comprising:

creating a structured representation of the command-language-based service by using information entered by a service creator via a first user interface;

registering the command-language-based service with a generic service provider, the generic service provider being a software module that provides command-language-based services as part of the graphical-based services system; and creating a second user interface corresponding to the command-language-based service created.

2. The method of claim 1, wherein the structure of the command-language-based service comprises:

a name of a command from a command-language set, upon which the service is to be based; and characteristics of options associated with the command, the characteristics being specified by the service creator to restrict the use of the command by the users of the command-language-based service.

3. The method of claim 2, wherein the characteristics of options include restricting the set of legal parameters and values permitted for each option, the option used as an argument of the command.

4. The method of claim 2, wherein the characteristics of options include user-friendly names to characterize each option, the names associated with the functionality of the corresponding options.

5. The method of claim 1, further comprising:

parameterizing the generic provider to provide system security.

6. The method of claim 5, wherein the step of parameterizing the generic provider comprises:

providing the generic provider with a list of commands that a service creator is not able to employ in a service.

7. The method of claim 5, wherein the step of parameterizing the generic provider comprises:

providing the generic provider with a capacity to filter dangerous characters supplied by service users.

8. The method of claim 1, wherein creating the second user interface comprises:

parameterizing a generic template with the information entered via the first user interface; and making the parameterized template available in the graphical-based service system.

9. The method of claim 8, wherein the parameterized template is immediately made available in the system.

10. The method of claim 1, wherein the registering step comprises:

making the registered command immediately available in the graphical-based service system.

11. A method for using a command-language-based service in the context of a graphical-based services system, comprising:

displaying a list of services available in the graphical-based services system to users of the system via a first user interface;

displaying a second user interface, corresponding to the registered command service, to users of the command-language-based service;

entering options associated with the command service via the second user interface;

submitting a command-language-based service execution call to a generic service provider, the call being parameterized with the entered options; and executing the command-language-based service.

12. The method of claim 11, wherein the command-language-based service has a structured representation that is uniform for each command-language-based service that is registered.

13. The method of claim 12, wherein the structured representation comprises:

a name of a command from a command-language set, upon which the service is based; and options associated with the command and restricted by a service creator.

14. The method of claim 13, wherein the options are expressed in terms of user-friendly names.

15. The method of claim 13, wherein the execution of the command-language-based service is performed by the generic service provider, the execution of the service being subject to the filtering of dangerous characters entered by a user as an option associated with the command.

16. A graphical-based services system with the capability to create and incorporate secure command-language-based services comprising:

a front-end computer network including a service use computer;

a service creation computer for displaying a first user interface to a service creator, acquiring via the first user interface information regarding a command-language-based service to be created, and creating a structured representation of the command-language-based service by using said information, wherein the information is input by the service creator and comprises structured descriptions of a command upon which the command-language-based service is based; and a back-end computer for providing the graphical-based services to users of the front-end computer network and for registering the command-language-based service in a generic service provider once the service is created, the generic service provider being a software module in the back-end computer that provides command-language-based services as part of the graphical-based services system;

wherein the back-end computer, the front-end computer network and the service creation computer are interconnected through a wide area network or a local area network.

17. The system of claim 16, wherein the generic service provider is capable of being parameterized to provide system security.

18. The system of claim 17, wherein parameterizing the generic service provider comprises:

providing the generic provider with a list of commands that a service creator would not be able to employ in a service.

19. The system of claim 17, wherein parameterizing the generic provider comprises:

providing the generic provider with a capacity to filter dangerous characters supplied by service users.

20. The system of claim 16, wherein the structured representation of said service comprises:

a name of a command from a command-language set, upon which the service is to be based; and characteristics of options associated with the command, the characteristics being specified by the service creator to restrict the use of the command by the users of the command-language-based service.

21. The system of claim 20, wherein the characteristics of options include restricting the set of legal parameters and values permitted for each option, the option used as an argument of the command.

22. The system of claim 20, wherein the characteristics of options include user-friendly names to characterize each option, the names associated with the functionality of the corresponding options.

23. The system of claim 16, wherein creating a structured representation of the command-language-based service comprises:

creating a second user interface corresponding to the command-language-based service created by parameterizing a generic template with the information acquired by the service creation computer and making the parameterized template available in the graphical-based service system.

24. The method of claim 23, wherein the parameterized template is immediately made available in the system.

25. The method of claim 16, wherein registering the command-language-based service comprises:

making the registered command immediately available in the graphical-based service system.

26. A system for using command-language-based services in the context of a graphical-based services system, comprising:

means for displaying a list of services available in the graphical-based services system to users of the system via a first user interface;

means for displaying a second user interface, corresponding to the registered command service, to users of the command-language-based service;

means for entering options associated with the command service via the second user interface; and means for executing the command-language-based service.

27. The system of claim 26, wherein the command-language-based service has a structured representation that is uniform for each command-language-based service that is registered.

28. The system of claim 27, wherein the structured representation comprises:
- a name of a command from a command-language set, upon which the service is based; and
- options associated with the command and restricted by a service creator.

29. The system of claim 28, wherein the execution of the command-language-based service is performed by the generic service provider being subject to the filtering of dangerous characters entered by a user as an option associated with the command.

30. The system of claim 28, wherein the options are expressed in terms of a user-friendly name.

31. A computer-readable storage medium containing a set of instructions for a general purpose computer, the set of instructions comprising:
- a display routine for displaying a first user interface to a service creator that allows entering information regarding a command-language-based service to be created in order to create a structured representation of the command-language-based service;
- a first input routine for accepting the information via the first user interface;
- a first output routine for creating the structured representation of the command-language-based service by using the information entered;
- a second output routine for sending information regarding the created service to a generic service provider;
- a second input routine for waiting for a notification from the generic service provider that the command-language-service has been registered; and
- a third output routine for creating a second user interface corresponding to the command-language-based service created.

32. The computer-readable storage medium of claim 31, wherein the structure of the command-language-based service comprises:
- a name of a command from a command-language set, upon which the service is to be based; and
- characteristics of options associated with the command, the characteristics being specified by the service creator to restrict the use of the command by the users of the command-language-based service.

33. The computer-readable storage medium of claim 32, wherein the characteristics of options include restricting the set of legal parameters and values permitted for each option, the option used as an argument of the command.

34. The computer-readable storage medium of claim 32, wherein the characteristics of options include user-friendly names to characterize each option, the names being associated with the functionality of the corresponding options.

35. The computer-readable storage medium of claim 31 wherein the the generic provider is parameterized to provide system security.

36. The computer-readable storage medium of claim 35, wherein the parameterization of the generic provider comprises:
providing the generic provider with a list of commands that a service creator is not able to employ in a service.

37. The computer-readable storage medium of claim 35, wherein the parameterization of the generic provider comprises:
providing the generic provider with a capacity to filter dangerous characters supplied by service users.

38. The computer-readable storage medium of claim 31, wherein creating the second user interface comprises:
- parameterizing a generic template with the information entered via the first user interface; and
- making the parameterized template available in the graphical-based service system.

* * * * *